(12) United States Patent
Dai et al.

(10) Patent No.: US 10,598,815 B2
(45) Date of Patent: Mar. 24, 2020

(54) DUAL INTEGRATED COMPUTATIONAL ELEMENT DEVICE AND METHOD FOR FABRICATING THE SAME

(71) Applicant: Halliburton Energy Services, Inc., Houston, TX (US)

(72) Inventors: Bin Dai, Spring, TX (US); James M. Price, Woodlands, TX (US); Christopher Michael Jones, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/528,752

(22) PCT Filed: Sep. 22, 2016

(86) PCT No.: PCT/US2016/053052
§ 371 (c)(1),
(2) Date: May 22, 2017

(87) PCT Pub. No.: WO2018/056978
PCT Pub. Date: Mar. 29, 2018

(65) Prior Publication Data
US 2018/0356557 A1    Dec. 13, 2018

(51) Int. Cl.
*G01V 8/02* (2006.01)
*E21B 49/08* (2006.01)
*E21B 44/00* (2006.01)

(52) U.S. Cl.
CPC .............. *G01V 8/02* (2013.01); *E21B 44/00* (2013.01); *E21B 49/08* (2013.01)

(58) Field of Classification Search
CPC .. E21B 49/08; E21B 49/005; E21B 2049/085; E21B 49/081; E21B 7/00;
(Continued)

(56) References Cited

U.S. PATENT DOCUMENTS 9,103,720 B2     8/2015  Russell et al.
2013/0284894 A1* 10/2013 Freese ................... G01N 21/17
                                                      250/208.2
(Continued)

FOREIGN PATENT DOCUMENTS

WO    WO-2015126386 A1    8/2015

OTHER PUBLICATIONS

International Search Report and Written Opinion from PCT/US2016/053052, dated May 10, 2017.

*Primary Examiner* — Taeho Jo
(74) *Attorney, Agent, or Firm* — Gilliam IP PLLC

(57) ABSTRACT

A device including at least two ICEs that optically interact with a sample light to generate a first and a second modified lights is provided. The at least two ICEs include alternating layers of material, each of the layers having a thickness selected such that the weighted linear combination of the transmission functions is similar to the regression vector associated with a characteristic of the sample. The device may also include a detector that measures a property of the first and second modified lights separately to generate a first and second signal, respectively, wherein the weighted average of first and second signals is linearly related to the characteristic of the sample. A method for fabricating the above device is also provided.

20 Claims, 11 Drawing Sheets

(58) Field of Classification Search
CPC .. E21B 47/01; E21B 47/011; E21B 47/02216; E21B 44/00; G01V 8/20; G01V 2210/1216; G01V 3/18; G01V 8/16; G01V 8/22; G01V 8/02; G02B 5/28; G01J 1/0492; G01J 1/20; G01J 2003/283
USPC .......................................................... 250/264
See application file for complete search history.

(56) References Cited

U.S. PATENT DOCUMENTS

| | | | |
|---|---|---|---|
| 2013/0284901 A1 | 10/2013 | Freese et al. | |
| 2013/0287061 A1* | 10/2013 | Freese | G01K 13/00 374/142 |
| 2014/0020462 A1* | 1/2014 | Irani | G01N 33/2823 73/152.55 |
| 2014/0110105 A1* | 4/2014 | Jones | E21B 47/10 166/250.01 |
| 2014/0121970 A1* | 5/2014 | Ljungdahl | E21B 49/005 702/6 |
| 2014/0324366 A1* | 10/2014 | Ljungdahl | E21B 49/005 702/49 |
| 2014/0339406 A1* | 11/2014 | Perkins | G01N 21/31 250/238 |
| 2014/0352953 A1* | 12/2014 | Gao | E21B 43/128 166/250.15 |
| 2015/0212232 A1 | 7/2015 | Perkins et al. | |
| 2015/0234976 A1* | 8/2015 | Chen | G06F 17/5081 716/132 |
| 2015/0260703 A1* | 9/2015 | Mitchell | E21B 47/00 73/19.09 |
| 2015/0293013 A1* | 10/2015 | Tunheim | G01N 21/75 435/39 |
| 2015/0330215 A1* | 11/2015 | Jamison | E21B 47/102 73/152.42 |
| 2015/0346087 A1 | 12/2015 | Skinner | |
| 2015/0356204 A1* | 12/2015 | Simcock | G02B 7/008 703/13 |
| 2016/0048627 A1 | 2/2016 | Perkins et al. | |
| 2016/0054285 A1 | 2/2016 | Freese et al. | |
| 2016/0076367 A1 | 3/2016 | Freese et al. | |
| 2016/0102510 A1* | 4/2016 | Mitchell | E21B 47/102 175/24 |
| 2016/0130696 A1 | 5/2016 | Price et al. | |
| 2016/0169794 A1 | 6/2016 | Powers et al. | |
| 2016/0187531 A1* | 6/2016 | Price | G01N 21/21 356/364 |
| 2016/0258741 A1* | 9/2016 | Perkins | G01N 21/39 |
| 2016/0274077 A1* | 9/2016 | Perkins | G01N 21/64 |
| 2016/0290131 A1* | 10/2016 | Mitchell | E21B 47/102 |
| 2017/0184509 A1* | 6/2017 | Holden | B65D 88/26 |
| 2017/0270225 A1* | 9/2017 | Chen | E21B 47/00 |
| 2017/0276601 A1* | 9/2017 | Nayak | G02B 5/28 |
| 2018/0112526 A1* | 4/2018 | Perkins | E21B 47/102 |

* cited by examiner

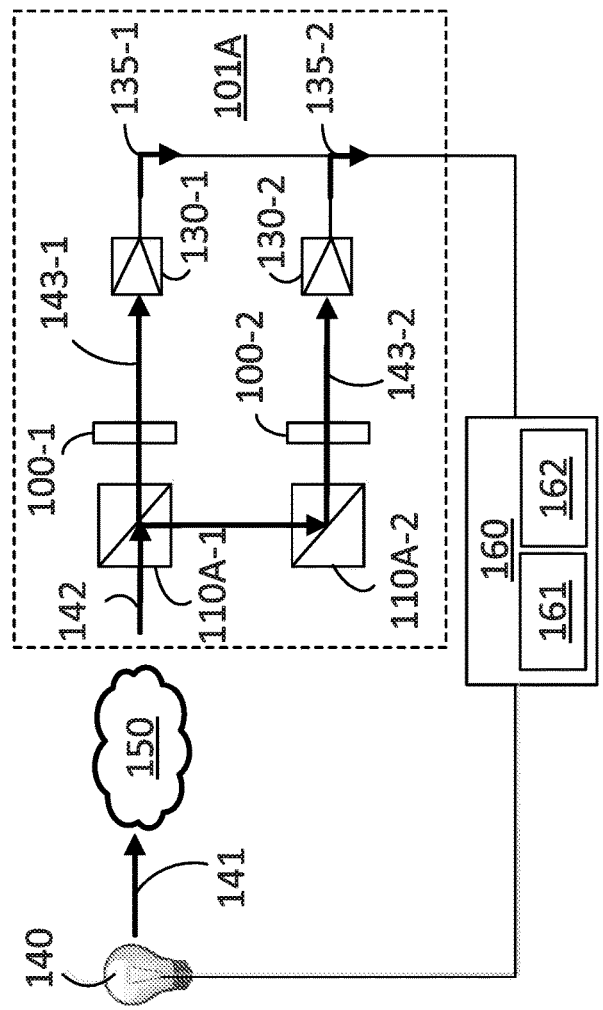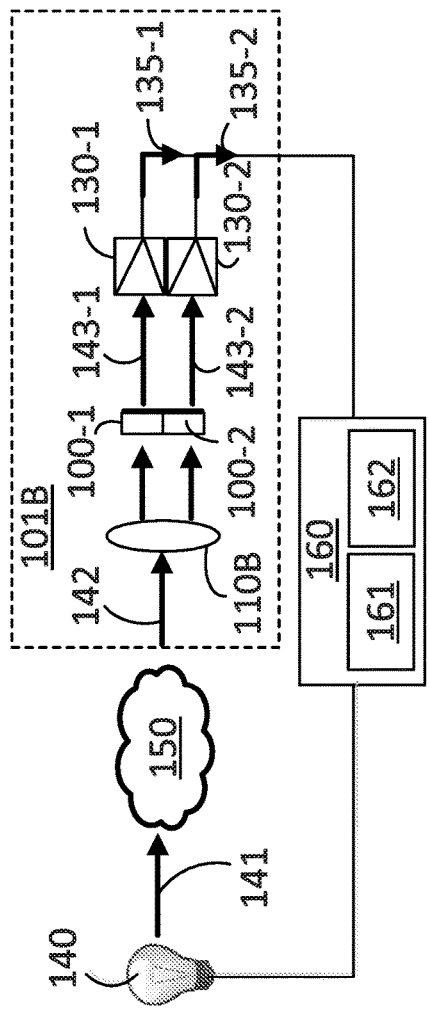
FIG. 1A
FIG. 1B

DUAL INTEGRATED COMPUTATIONAL ELEMENT DEVICE AND METHOD FOR FABRICATING THE SAME

BACKGROUND

In the field of oil and gas exploration and production, sample characterization of reservoir or wellbore fluid compositions is desirable to determine the quality of a product or the condition of a container, a wellbore, or a pipeline, or to adjust and modify a drilling parameter. Some sample characterization measurement devices sacrifice measurement quality in favor of compactness and robustness. To improve measurement quality, some sensing tools include multiple sensors performing orthogonal measurements, which increase the tool complexity and data processing procedures.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to those skilled in the art and having the benefit of this disclosure.

FIG. 1A illustrates a first system for measuring a characteristic of a sample using an optical computing device including a dual Integrated Computational Element (ICE).

FIG. 1B illustrates a second system for measuring a characteristic of a sample using an optical computing device including a dual ICE.

In the figures, elements or steps having the same or similar reference numerals have the same or similar description and configuration, unless stated otherwise.

DETAILED DESCRIPTION

Figure 2:
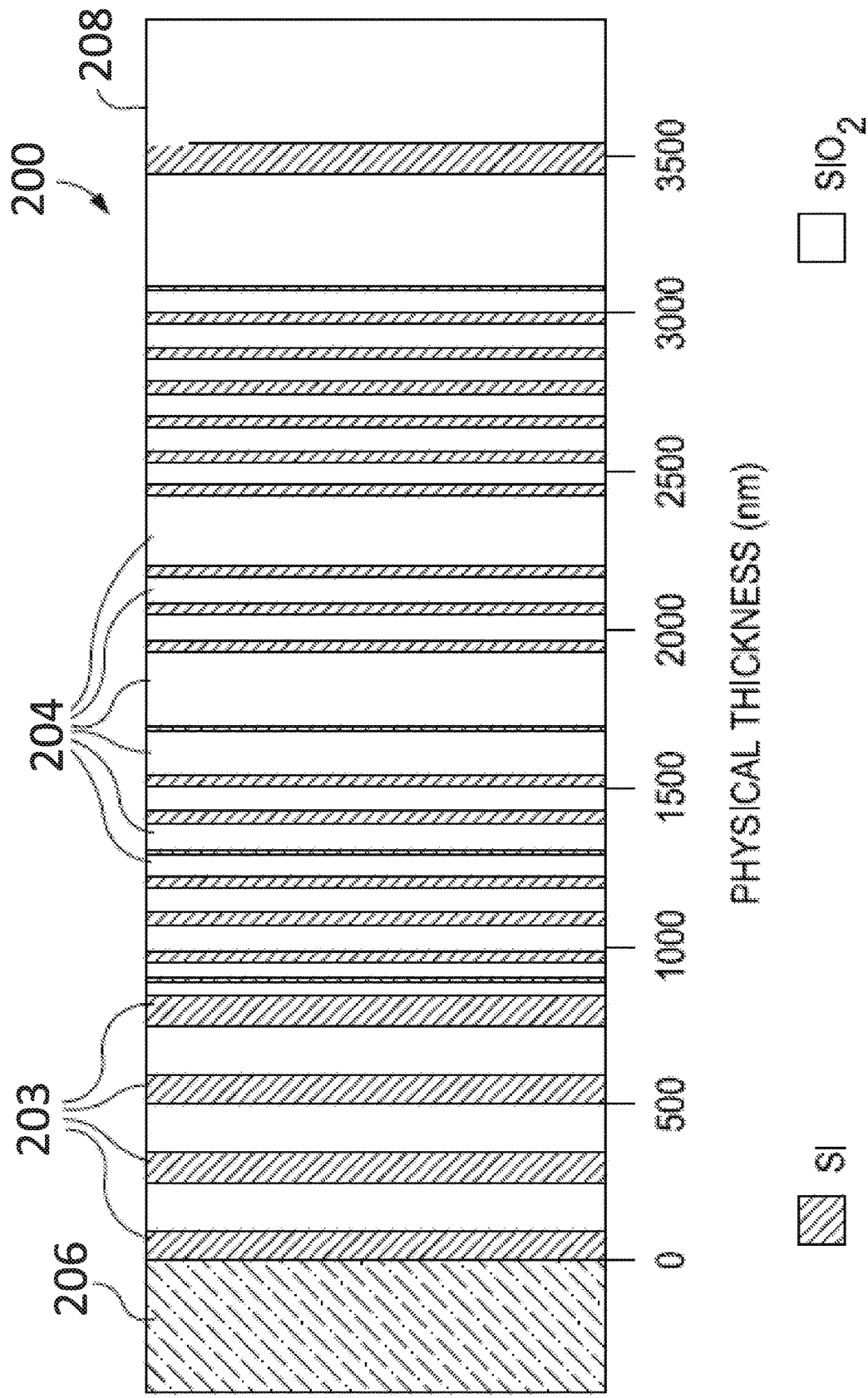
FIG. 2 illustrates a cross-sectional view of an exemplary ICE for measuring a desired characteristic of a sample.

The present disclosure relates to systems, devices and methods for measuring a selected characteristic of a sample in the oil and gas exploration and extraction industry using an optical computing device with a dual integrated computational sensing element.

An Integrated Computational Element (ICE) as disclosed herein is a processing element that optically interacts with a substance to determine quantitative and/or qualitative values of one or more physical or chemical properties of the substance. The ICE may include a multilayered interference element designed to operate over a continuum of wavelengths in the electromagnetic spectrum including the ultraviolet (UV, about 290 nm to about 400 nm), the visible (VIS, about 400 nm to about 750 nm), the near-infrared (NIR, about 750 nm to about 2500 nm), the mid-infrared ranges (MIR, about 2500 nm to about 10,000 nm), or any sub-set of those regions. Electromagnetic radiation that optically interacts with the ICE is modified to be readable by a detector such that an output of the detector can be correlated to the physical or chemical property or "characteristic" of the substance being analyzed.

As used herein, the term "characteristic" refers to a chemical, mechanical, or physical property of a substance. The characteristic of the substance may include a quantitative or qualitative value of one or more chemical constituents or compounds present therein, or any physical property associated therewith. Such chemical constituents and compounds may be alternately referred to as "analytes." Illustrative characteristics of a substance that can be monitored with the optical computing devices described herein can include chemical composition (e.g., identity and concentration in total or of individual components), phase presence (e.g., gas, oil, water, etc.), impurity content, ion content, pH, alkalinity, viscosity, density, ionic strength, total dissolved solids, salt content (e.g., salinity), porosity, opacity, bacteria content, total hardness, combinations thereof, state of matter (solid, liquid, gas, emulsion, mixtures, etc.), and the like.

As used herein, the term "electromagnetic radiation" refers to radio waves, microwave radiation, mid-infrared (MIR) and near-infrared radiation (NIR), visible light (VIS), ultraviolet light (UV), X-ray radiation and gamma ray radiation.

As used herein, the term "optical computing device" refers to an optical device that is configured to receive an input of electromagnetic radiation from an electromagnetic source, to interact the electromagnetic radiation with a substance and to produce an output of electromagnetic radiation from a processing element arranged within the optical computing device. In some embodiments, an optical computing device also includes a detector to generate an electronic signal indicative of a characteristic of the substance. The processing element may be, for example, an ICE, or a multivariate optical element (MOE). The electromagnetic radiation that optically interacts with the processing element is modified so as to be readable by a detector, such that an output of the detector can be correlated to a particular characteristic of the substance. The output of electromagnetic radiation from the processing element can be reflected, transmitted, and/or dispersed electromagnetic radiation. Whether the detector analyzes reflected, transmitted, or dispersed electromagnetic radiation may be dictated by the structural parameters of the optical computing device as well as other considerations known to those skilled in the art. In addition, emission and/or scattering of the fluid, for example via fluorescence, luminescence, Raman, Mie, and/or Raleigh scattering, can also be monitored by optical computing devices.

As used herein, the term "optically interact" or variations thereof refers to the reflection, transmission, scattering, diffraction, or absorption of electromagnetic radiation either on, through or from one or more processing elements (i.e., ICE or MOE components) or a substance being analyzed by the processing elements. Accordingly, optically interacted light refers to electromagnetic radiation that has been reflected, transmitted, scattered, diffracted, or absorbed, emitted, or re-radiated, for example, using a processing element, but may also apply to interaction with a substance.

Embodiments disclosed herein include methods to design at least two ICEs that cooperatively achieve close to optimal measurement sensitivity and accuracy in determining a desired characteristic of a sample. The method relies on a simultaneous optimization of the thin film structures of the at least two ICEs such that weighted average of detector responses of the at least two ICEs have an optimal correlation with the selected characteristic of the sample. Consequently, this method improves upon measurement accuracy and sensitivity of optical computing devices that use only a single ICE.

Methods described herein provide significant improvement in terms of design efficiency and likelihood for finding a desirable set of ICEs that will enhance performance of an optical computing device. The design flexibility gained by using more than one ICE enables finding optical computing device solutions for measurement problems that may prove hard to solve using a single ICE approach. Design and use of more than one ICE allows the optical computing cost to be distributed between two or more ICEs. Accordingly, the design complexity of each of the two or more ICEs may be reduced, and the ICEs be more easily manufactured, with less probability for error and variability. Optical computing devices as disclosed herein have analytical performances matching the performance of a laboratory FTIR spectrometer, which may be considered a gold standard of spectroscopic measurements.

In a first embodiment, a device includes at least two ICEs that optically interact with a sample light to generate a first modified light and a second modified light. Each of the at least two ICEs includes a plurality of alternating layers of material, and each of the layers has a thickness selected such that a weighted linear combination of a transmission functions from each of the at least two ICEs is similar to a PLS regression vector associated with a characteristic of the sample. The device may also include a detector that separately measures a property of the first and second modified lights to generate a first signal and a second signal, respectively. In some embodiments, the detector includes two separate detectors, each measuring a property of the first and second modified lights, respectively. The weighted average value of first and second signals may be linearly related to the characteristic of the sample.

In a second embodiment, a system includes an optical source that generates an illumination light to interact with a sample and form a sample light, and an optical computing device. The optical computing device may include at least two ICEs that optically interact with a sample light to generate a first modified light and a second modified light. Each of the at least two ICEs includes a plurality of alternating layers of material, and each of the layers has a thickness selected such that the weighted linear combination of a transmission function of each of the at least two ICEs is similar to a regression vector associated with a characteristic of the sample. The device may also include one or more detectors that separately measures a property of the first and second modified lights to generate a first signal and a second signal, respectively. The weighted average value of first and second signals may be linearly related to the characteristic of the sample. The system may further include a controller having a processor and a memory, wherein the processor receives the first and second signal and determines a value for the desired characteristic of the sample.

In yet another embodiment, a method includes generating at least two integrated computational elements ICEs, each ICE including a plurality of alternating layers of two materials and each layer having a random thicknesses as initial layer thicknesses. The method may also include determining a transmission spectrum for each of the at least two ICEs, projecting the transmission spectra of the at least two ICEs to a calibration sample spectra to determine a detector response for each of the at least two ICEs and each calibration sample, and correlating the weighted average of detector responses to a concentration of a selected characteristic of a sample. In some embodiments, the method includes optimize the thickness of one or more of the layers in at least one of the at least two ICEs to achieve a pre-selected correlation target, and assembling an optical computing device including the at least two ICEs when the correlation target is achieved.

FIGS. 1A and 1B illustrate systems 10A and 10B that may be used for measuring a selected characteristic of a sample fluid 150 using optical computing devices 101A and 101B, respectively (hereinafter, collectively referred to as optical computing devices 101). Optical computing devices 101 each include an optical source 140 that provides an illumination light 141 to interact with sample 150, thus generating a sample light 142. Optical source 140 may be a broadband lamp, a laser, a light-emitting diode, or any other source of electromagnetic radiation. In some embodiments, sample light 142 may include fluorescence emitted photons or Raman shifted photons from sample 150.

Beamsplitters 110A-1 and 110A-2 in system 10A and lens 110B in system 10B (hereinafter collectively referred to as optical components 110) separate and direct portions of sample light 142 to one of sensing elements 100-1 and 100-2, respectively (hereinafter collectively referred to as sensing elements 100). In system 10A, sensing elements 100 may comprise separate optical components positioned within separate optical trains. In system 10B, sensing elements 100 are disposed adjacent to one another on the same substrate to form a single optical component, therefore allowing for a more compact design of optical computing device 101B. Other configurations are possible by using a variety of optical components 110 such as optical fibers, prisms, mirrors, and waveguide devices without departing from the general concept disclosed herein.

Sensing elements 100 interact with the separated portions of sample light 142 to provide modified lights 143-1 and 143-2, respectively (hereinafter collectively referred to as modified lights 143). A property of modified lights 143 is indicative of a desired characteristic of sample 150. In some embodiments, the property of the modified light 143 that is indicative of the characteristic of sample 150 may be an intensity, a polarization state, a phase, a wavelength, or any combination of the above.

Optical computing devices 101 also include detectors 130-1 and 130-2 (collectively referred hereinafter to as detectors 130) that receive modified lights 143-1 and 143-2, respectively. Detectors 130 provide sensing signals 135-1 and 135-2 (hereinafter collectively referred to as sensing signals 135) to a controller 160. Sensing signals 135 may be linearly or non-linearly associated with the spectral density distribution of sample light 142. Sensing signals 135 may be, without limitation, electrical signals transmitted through a wire, optic signals transmitted through an optical fiber, or acoustic signals transmitted through a wellbore fluid in a downhole application.

Controller 160 may include a processor 161 and a memory 162. Memory 162 stores data and commands which, when executed by processor 161, cause controller 160 to direct systems 10A,B to perform steps in methods consistent with the present disclosure.

FIG. 2 illustrates a cross-sectional view of an exemplary integrated computational element (ICE) 200 for measuring a concentration in sample fluid 150. ICE 200 may be similar to or the same as sensing elements 100 of FIGS. 1A-B and, therefore, may be used in optical computing devices 101A,B of FIGS. 1A-B. As illustrated, ICE 200 may include a plurality of alternating layers of material 203 and 204, such as silicon (Si) and $SiO_2$ (quartz), respectively. In general, layers 203, and 204 include materials whose index of refraction is high and low, respectively (e.g., different, in general). Other examples of materials for use in layers 203 and 204 might include niobia and niobium, germanium and germania, MgF, SiO, and other high and low index materials known in the art. Layers 203, 204 may be strategically deposited on an optical substrate 206. In some embodiments, the optical substrate 206 is BK-7 optical glass. In other embodiments, optical substrate 206 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At the opposite end (e.g., opposite optical substrate 206 in FIG. 2), ICE 200 may include a layer 208 that is generally exposed to the environment of the device or installation, and may be able to detect a sample substance. The number of layers 203, 204 and the thickness of each layer 203, 204 are determined from the spectral attributes acquired from a spectroscopic analysis of a characteristic of the substance being analyzed using a conventional spectroscopic instrument. The spectrum of interest of a given characteristic typically includes any number of different wavelengths. It should be understood that ICE 200 in FIG. 2 does not in fact represent any particular characteristic of a given substance, but is provided for purposes of illustration only. Consequently, the number of layers 203, 204 and their relative thicknesses, as shown in FIG. 2, bear no correlation to any particular characteristic of a sample. Nor are layers 203, 204 and their relative thicknesses necessarily drawn to scale, and therefore should not be considered limiting of the present disclosure. Moreover, those skilled in the art will readily recognize that the materials that make up each layer 203, 204 (i.e., Si and $SiO_2$) may vary, depending on the application, cost of materials, and/or applicability of the material to the given substance being analyzed.

In some embodiments, the material of each layer 203, 204 can be doped or two or more materials can be combined in a manner to achieve the desired optical characteristic. In addition to solids, ICE 200 may also contain liquids and/or gases, optionally in combination with solids, in order to produce a desired optical characteristic. In the case of gases and liquids, ICE 200 can contain a corresponding vessel (not shown), which houses the gases or liquids. Exemplary variations of ICE 200 may also include holographic optical elements, gratings, piezoelectric, light pipe, and/or acousto-optic elements, for example, that can create transmission, reflection, and/or absorptive properties of interest.

Layers 203 and 204 exhibit different refractive indices. By properly selecting the materials of layers 203, 204 and their relative thickness and spacing, ICE 200 may be configured to selectively pass/reflect/refract predetermined fractions of electromagnetic radiation at different wavelengths. Each wavelength is given a predetermined weighting or loading factor. The thickness and spacing of layers 203, 204 may be determined using a variety of approximation methods from the spectrum of the characteristic or analyte of interest. These methods may include inverse Fourier transform (IFT) of the optical transmission spectrum and structuring ICE 200 as the physical representation of the IFT. The approximations convert the IFT into a structure based on known materials with constant refractive indices.

The weightings that layers 203, 204 of ICE 200 apply at each wavelength are set to the regression weightings described with respect to a known equation, or data, or spectral signature. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance. ICE 200 performs the dot product of the electromagnetic radiation received by ICE 200 (e.g., sample light 142, cf. FIG. 1) and the wavelength dependent transmission function of ICE 200. The wavelength dependent transmission function of ICE 200 is dependent on the layer material refractive index, the number of layers 203, 204 and the layer thicknesses. The transmission function of ICE 200 is designed to mimic, in conjunction with at least one other ICE, a desired regression vector derived from the solution to a linear multivariate problem targeting a specific component of the sample being analyzed. As a result, a suitable combination of the output light intensities of at least two ICEs 200 (e.g., the intensity of modified lights 143, cf. FIGS. 1A-B) is proportional a dot product of a transmission spectrum of the sample with a regression vector associated with the characteristic of interest. Accordingly, the output light intensities of at least two ICEs 200 is a direct indicator of a value (e.g., analyte concentration) of the characteristic of interest of the sample.

Optical computing devices 101 employing ICEs 200 may be capable of extracting the information of the spectral fingerprint of multiple characteristics or analytes within a substance and converting that information into a detectable output regarding the overall properties of the substance. That is, through suitable configurations of the two or more ICEs in an optical computing device as disclosed herein, electromagnetic radiation associated with a selected characteristic of a sample can be separated from electromagnetic radiation associated with all other components of the sample. Thus, the selected characteristic of a sample may be estimated in real-time or near real-time. Accordingly, the combination of two or more ICEs 200 is able to distinguish and process electromagnetic radiation related to a characteristic or analyte of interest.

Figure 3:
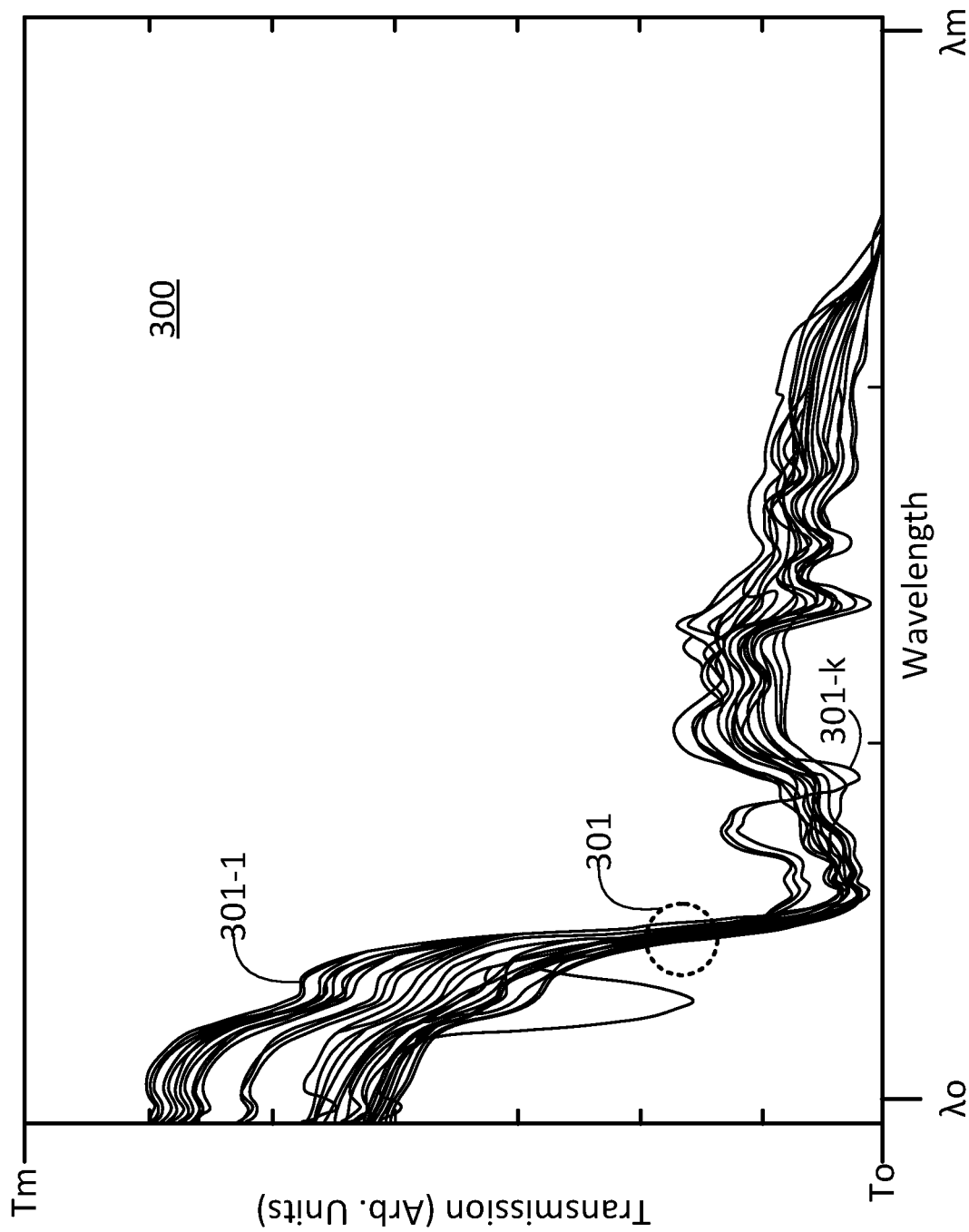
FIG. 3 illustrates a chart with optical spectra of multiple fluids having varied $CO_2$ concentrations.

FIG. 3 illustrates a chart 300 with spectra 301 of a sample light from a reference sample having varied, known $CO_2$ concentrations in a hydrocarbon fluid (e.g., petroleum), at high temperature and high pressure conditions. Without limitation, spectra 301 correspond to Fourier Transform Infrared (FTIR) spectra of four hundred (400) calibration samples containing a variable $CO_2$ concentration. For the calibration samples in spectra 301, the $CO_2$ concentration varies from 0 to 0.1 grams per cubic centimeter (g/cc). The abscissae in chart 300 correspond to wavelength values in a range from $\lambda_0$ to $\lambda_m$ ($\lambda_0$, $\lambda_m$). The range ($\lambda_0$, $\lambda_m$) may be any one of the UV, VIS, NIR, MIR regions, or any combination of the above. The ordinates in chart 300 correspond to a transmission value within a minimum transmission To, and a maximum transmission Tm (To, Tm). In some embodiments, the range (To, Tm) is a unitary range (0, 1).

An optical computing device to measure the $CO_2$ concentration from the samples in chart 300 may include an ICE designed as a single, broadband optical filter to generate a modified light 143 and a sensing signal 135 proportional to a property of interest of a sample. In some embodiments, the ICE transmission function, T, satisfies an optimization condition as follows:

$$T_{opt} = \arg\min\|y-\hat{y}\|^2, \text{ where } \hat{y} = \beta(T \cdot x) + \alpha \quad (1)$$

Where $T_{opt}$ is the optimal ICE transmission pattern, y is a value representing an amplitude of the desired characteristic of the sample (e.g., a concentration of an analyte of interest), $\hat{y}$ is a linear estimation of y, and x is the optical spectrum of sample light 142. The symbol "·" signifies a dot product operator. In that regard, vector T has a dimension given by the number of elements in the spectrum x of the sample (e.g., the dimension of spectra 301, cf. FIG. 3). Accordingly, a sensing signal 135 may be associated with the dot product TA. The ICE transmission pattern, T, is determined by the thickness and the index of refraction of the layers in the ICE design (e.g., layers 203 and 204 in ICE 200, cf. FIG. 2). An optimization algorithm may be used to find $T_{opt}$ by adjusting the thickness of each layer of ICE thin-film structure such that the error of prediction $\|y-\hat{y}\|^2$ is minimized.

The solution to Eq. 1 also involves finding values for the slope, β, and the constant, α. The slope, β, in Eq. 1 is associated with the sensitivity of the ICE-based measurement with respect to the desired characteristic of the sample. Note that, in the single ICE optical computing device model of Eq. 1, when TA is associated with a detector signal 135, the resulting T is constrained to be a vector with positive, bounded values between 0 and 1. The vector is positive because sensing signal 135 is generated at detector 130 as a response to an energy input from modified light 143, and energy is a positive quantity. The vector is bounded because an energy in modified light 143 is expected not to surpass an energy in sample light 142. In configurations where sensing element 100 amplifies at least a portion of sample light 142, at least some elements in vector T may be higher than one.

Due to the non-convex nature of the optimization problem posed in Eq. 1, a global minimization solution might not be obtained from a single starting point when a single ICE is considered. Accordingly, multiple initial seeds are used to increase the chance of finding the global minimal.

The presently disclosed embodiments provide a method to design two or more ICEs (e.g., ICE 100-1 and 100-2, cf. FIGS. 1A-B) that generate two corresponding detector responses (e.g., 135-1 and 135-2, cf. FIGS. 1A-B). The two detector responses can be linearly combined to obtain a value $\hat{y}$, proportional to the desired sample characteristic.

In some embodiments, ICEs 100-1 and 100-2 are selected such that weighted average of signals 135-1 ($T_1 \cdot x$) and 135-2 ($T_2 \cdot x$) reduce a prediction error for the sample characteristic, y, where $T_1$ is the transmission pattern of ICE 100-1 and $T_2$ is the transmission pattern of ICE 100-2. Accordingly, the design of ICE 100-1 and 100-2 in terms of number and thickness of alternating layers of dielectric materials is formulated as the following optimization problem:

$$T_{1,2,opt} = \arg\min\|y-\hat{y}\|^2, \text{ where } \hat{y} = \beta_1(T_1 \cdot x) + \beta_2(T_2 \cdot x) + \alpha \quad (2)$$

where $T_{1,2,opt}$ are the optimal ICE transmission patterns of ICE 100-1 and ICE 100-2 (two separate vectors: $T_{1opt}$ and $T_{2opt}$), and x is the spectrum of sample light 142. The optimization aims to finding an optimal pair of transmission vectors $T_1$ and $T_2$ by adjusting the thickness of each layer of thin-film structures in ICEs 100-1 and 100-2 such that the error of prediction $\|y-\hat{y}\|^2$ in Eq. 2 is reduced, desirably to a minimum.

The solution to Eq. 2 also involves finding values for $\beta_1$, $\beta_2$, and the constant, α. While all components in $T_{1opt}$ and $T_{2opt}$ may be bounded and positive, the values of $\beta_1$ and $\beta_2$ may have opposite signs. In some embodiments, ICEs 100-1 and 100-2 are selected such that signals 135-1 ($T_1 \cdot x$) and 135-2 ($T_2 \cdot x$) increase or maximize the sensitivity of detection. Accordingly, the searching process for $T_{1opt}$ and $T_{2opt}$ can be formulated as the following optimization problem.

$$T_{1,2,opt} = \arg\max(\text{slope}), \text{ where slope} = [\beta_1(T_1 \cdot x) + \beta_2(T_2 \cdot x) + \alpha]/y \quad (3)$$

In yet other embodiments, ICEs 100-1 and 100-2 can be designed to minimize a weighted average of accuracy (e.g., $\|y-\hat{y}\|^2$) and sensitivity (e.g., arg max(slope)) to balance a tradeoff between accuracy and sensitivity.

Further, some embodiments within the scope of the present disclosure may include an optical computing device having more than ICE 100-1 and ICE 100-2 designed to cooperatively produce optimal analytical performance. Accordingly, in some embodiments a number 'n' of ICEs 100-1, 100-2, ..., 100-n may be selected from an optimization as follows:

$$T_{1,2,\ldots,n,opt} = \arg\min\|y-\hat{y}\|^2, \text{ where}$$

$$\hat{y} = \beta_1(T_1 \cdot x) + \beta_2(T_2 \cdot x) + \ldots + \beta_n(T_n \cdot x) + \alpha \quad (4)$$

Due to the non-convex nature of this optimization problem, a global minimization/maximization solution might not be obtained with a single starting point. Oftentimes, multiple initial seeds are used to increase the chance of finding the global minimal.

Figure 4:
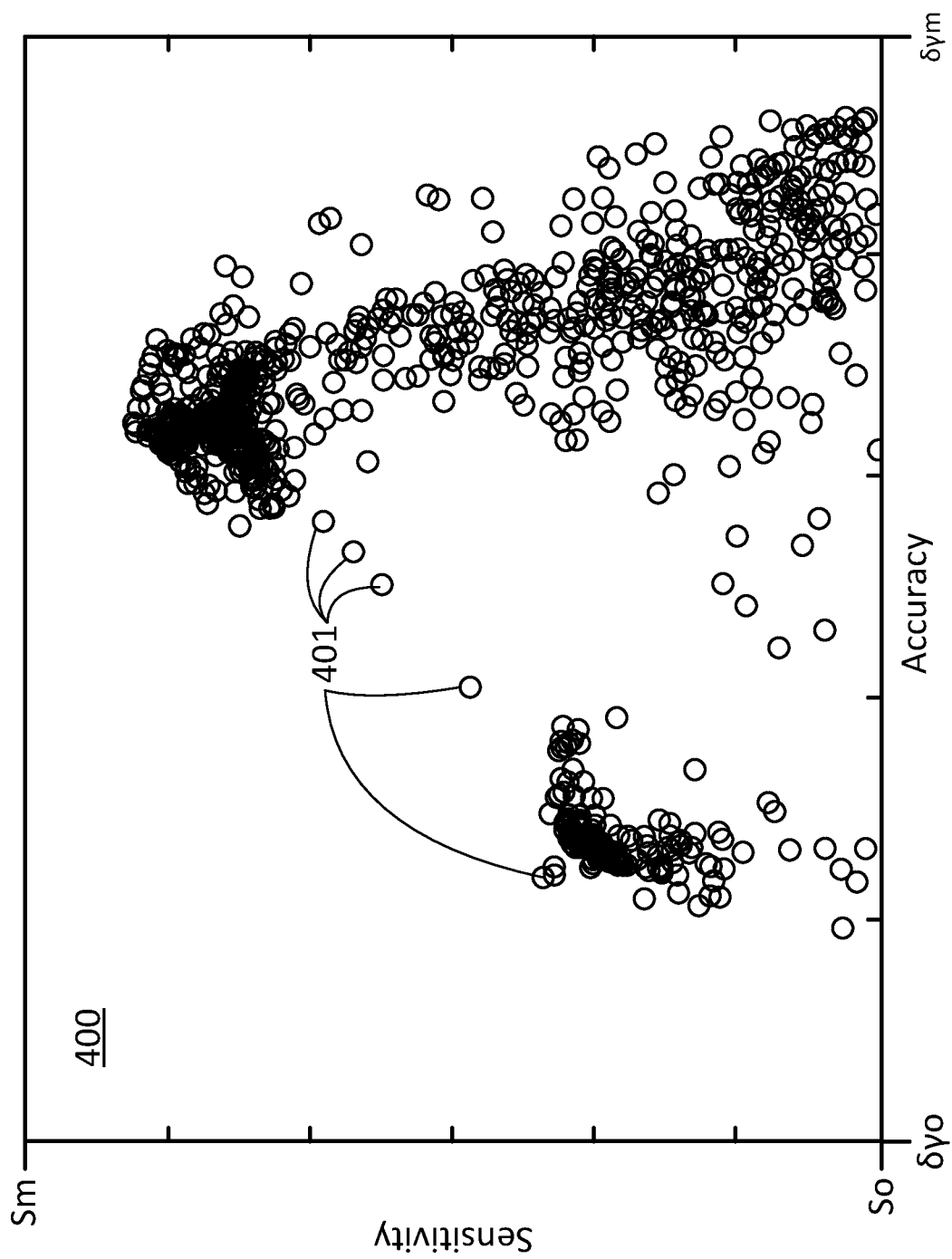
FIG. 4 illustrates a distribution of measurement performances of 100 different dual ICE design pairs, some design pairs with low accuracy value and high sensitivity value are desirable dual ICE pairs.

FIG. 4 illustrates a distribution plot 400 of performances of optical computing device models including a dual-ICE. Each optimized ICE pair is represented in distribution plot 400 by a point 401. For each point 401 in plot 400, values of $\beta_1$, $\beta_2$ and α are selected (cf. Eq. 2). Without limitation, distribution plot 400 includes one thousand (1000) optimized ICE pairs to increase the probability of finding a global optimal solution to the optimization problem posed in Eqs. 2 and 3. Each point 401 corresponds to a local optimization solution to Eq. 2 or 3 obtained from a different random "seed" or "starting point." Each "seed" design goes through the optimization process until convergence to a local optimization point 401. The optimization objective is a weighted average of measurement sensitivity and measurement accuracy.

The abscissa of points 401 is the measurement accuracy and the ordinate is the measurement sensitivity associated with the selected pair of ICEs 100-1 and 100-2. Accordingly, the abscissa in point 401 has a value $$\frac{1}{P}\sum_p \|y_p - \hat{y}_p\|^2,$$

where the sum is taken over the four hundred spectra 301 (P=400, cf. FIG. 3), and each of the $y_p$ values is calculated using Eq. 2 for the specific pair of ICEs 100-1 and 100-2 (with selected values of $\beta_1$, $\beta_2$, and a). In some embodiments, the ordinate in point 401 is estimated as the slope of a linear fit to a distribution of 'P' data points where the ordinate is given by the 'y' value in Eq. 2, and the abscissa is given by the $CO_2$ concentration value corresponding to the spectrum $x_p$.

Plot 400 illustrates that a substantial percentage of ICE 100-1 and 100-2 designs have desirable figures of merit (i.e. low abscissa and a high ordinate). Accordingly, an exemplary ICE design may be selected for fabrication for use in an optical computing device from the upper left corner in plot 400.

Figure 5:
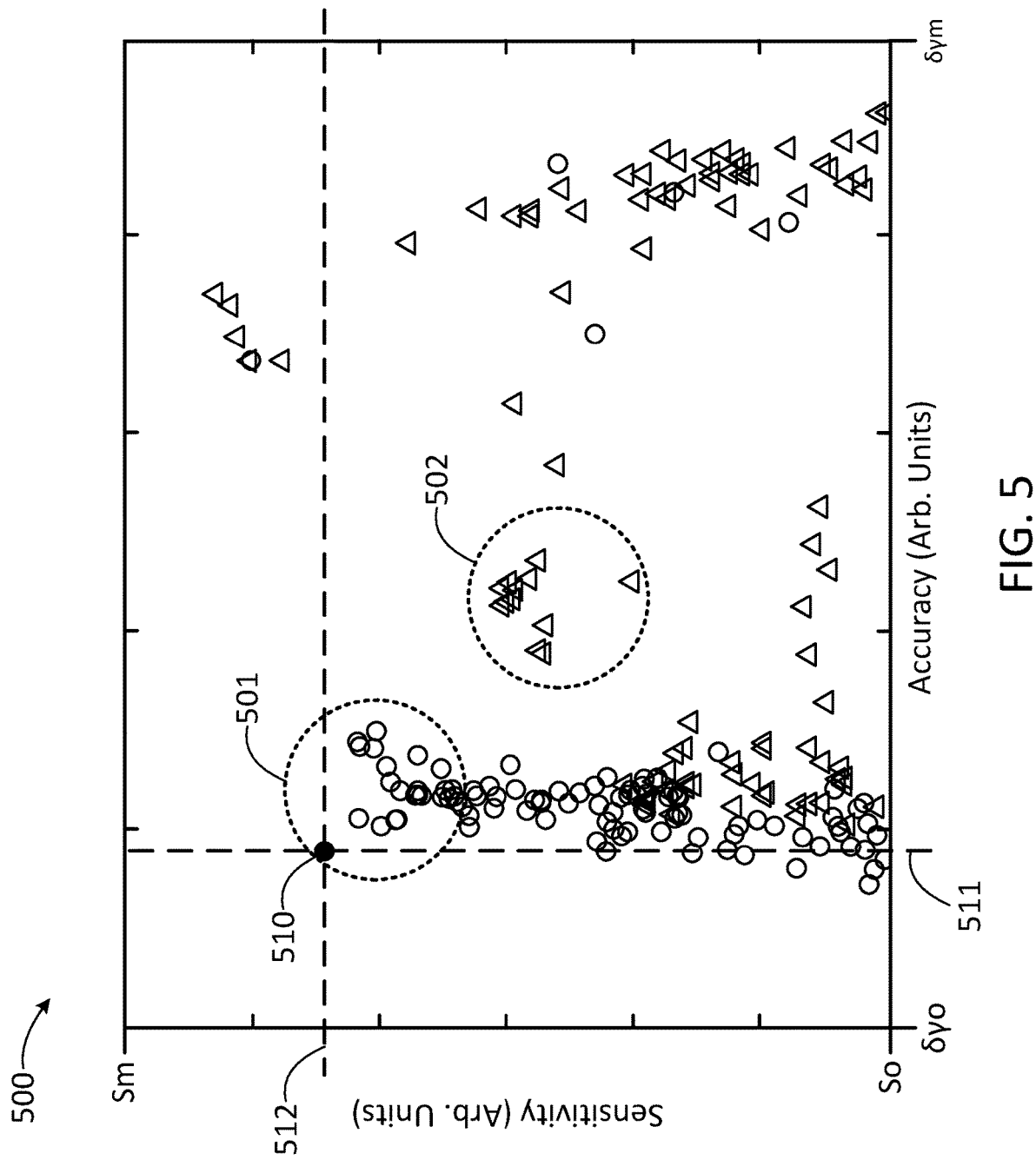
FIG. 5 illustrates a chart comparing a distribution of measurement performances of one-hundred (100) dual ICE design pairs and one-hundred (100) single-ICE design.

FIG. 5 illustrates a plot 500 including a distribution 501 (circles) of performances of one hundred (100) optical computing devices including a dual-ICE model, and a distribution 502 (triangles) of one hundred (100) optical computing devices including a single-ICE. The ordinates and abscissae in plot 500 are as described above in relation to plot 400 (cf. FIG. 4).

In plot 500, points in distribution 501 are located substantially to the left and above from points in distribution 502. Accordingly, plot 500 shows a significantly higher probability of obtaining good optical computing devices (better accuracy and higher sensitivity) using dual ICE designs as compared to single ICE designs. Point 510 in plot 500 indicates the accuracy 511 and the sensitivity 512 of a laboratory-based partial least squares regression (PLSR) determination of $CO_2$ concentration using the full spectra 301. The PSLR solution (i.e., point 510) may be considered as a gold standard for the measurement. Accordingly, points in distribution 501 are substantially closer to point 510 as compared to points in distribution 502.

Figure 6:
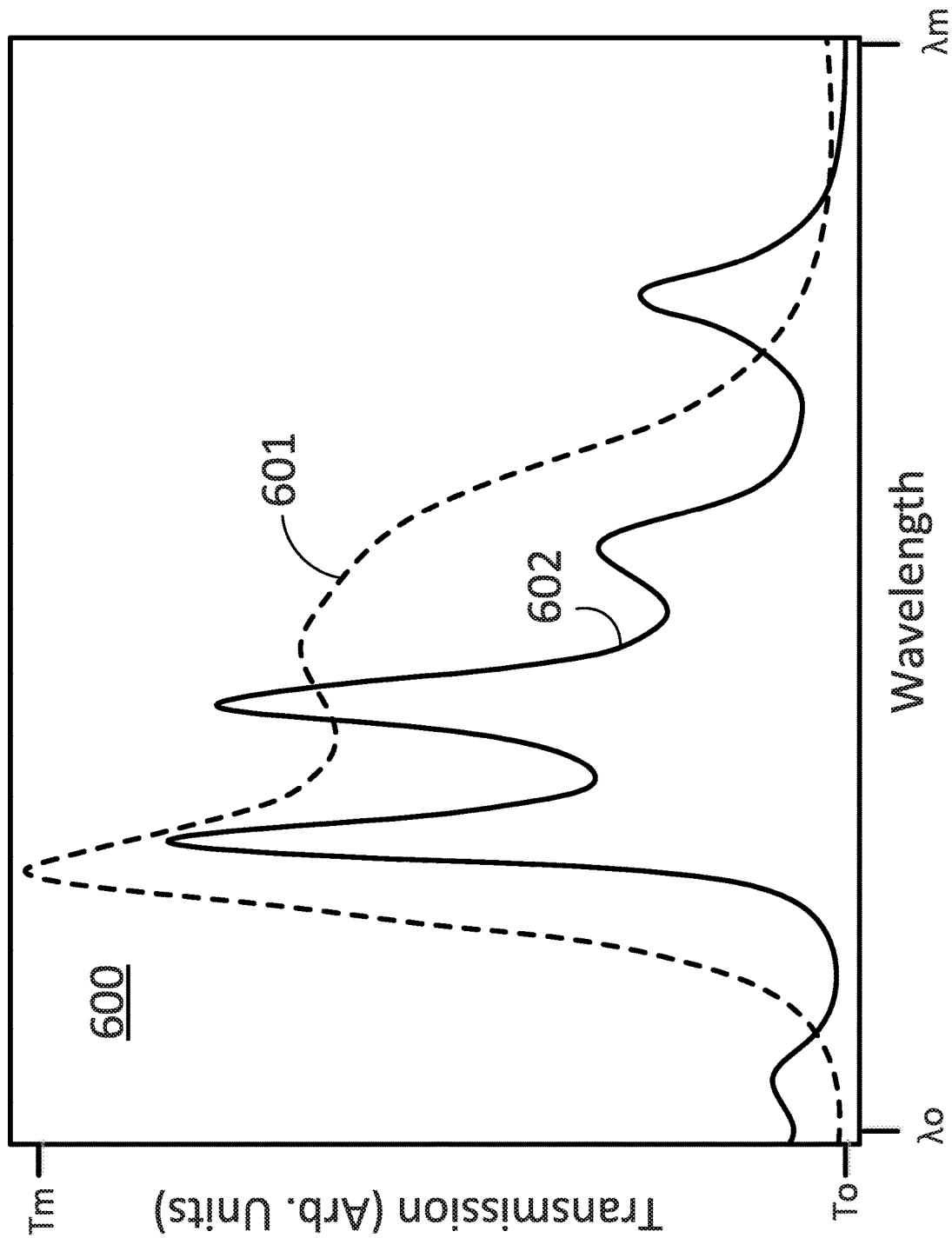
FIG. 6 illustrates a chart with transmission spectra of a first ICE and a second ICE.

FIG. 6 illustrates a chart 600 with a transmission spectrum 601 from ICE 100-1 and a transmission spectrum 602 from ICE 100-2 in a dual-ICE configuration as disclosed herein. Without limitation, transmission spectra 601 and 602 correspond to vectors $T_{1opt}$ and $T_{2opt}$ (cf. Eq. 2), where y is a $CO_2$ concentration and x are spectra 301 (cf. Eq. 2 and FIG. 3). The specific layer thicknesses in ICE 100-1 and ICE 100-2 are provided in TABLE I. As can be seen from TABLE I, the number of layers in ICEs 100-1 and 100-2 may be different, as well as their thicknesses (in nanometers, nm). In fact, each of ICEs 100-1 and 100-2 may be completely different from one another, and yet both ICEs 100-1 and 100-2 cooperatively measure the selected characteristic of the sample (cf. Eq. 2). The ordinates (To, Tm) and the abscissae ($\lambda_0$, $\lambda_m$) in chart 600 may be as described above (e.g., chart 300, cf. FIG. 3).

TABLE I

| Materials | Thickness (nm) | T1 (nm) | T2 (nm) |
|---|---|---|---|
| Si | Layer 1 | 815.86 | 278.63 |
| SiO2 | Layer 2 | 368.10 | 39.32 |
| Si | Layer 3 | 9.00 | 1510.39 |
| SiO2 | Layer 4 | 511.70 | 993.04 |
| Si | Layer 5 | 319.37 | 1545.50 |
| SiO2 | Layer 6 | 597.19 | 489.75 |
| Si | Layer 7 | 1479.79 | 1145.02 |
| SiO2 | Layer 8 | 437.66 | 353.33 |
| Si | Layer 9 | 799.75 | 1965.20 |
| SiO2 | Layer 10 | 833.80 | 826.28 |
| Si | Layer 11 | N/A | 393.43 |

Figure 7:
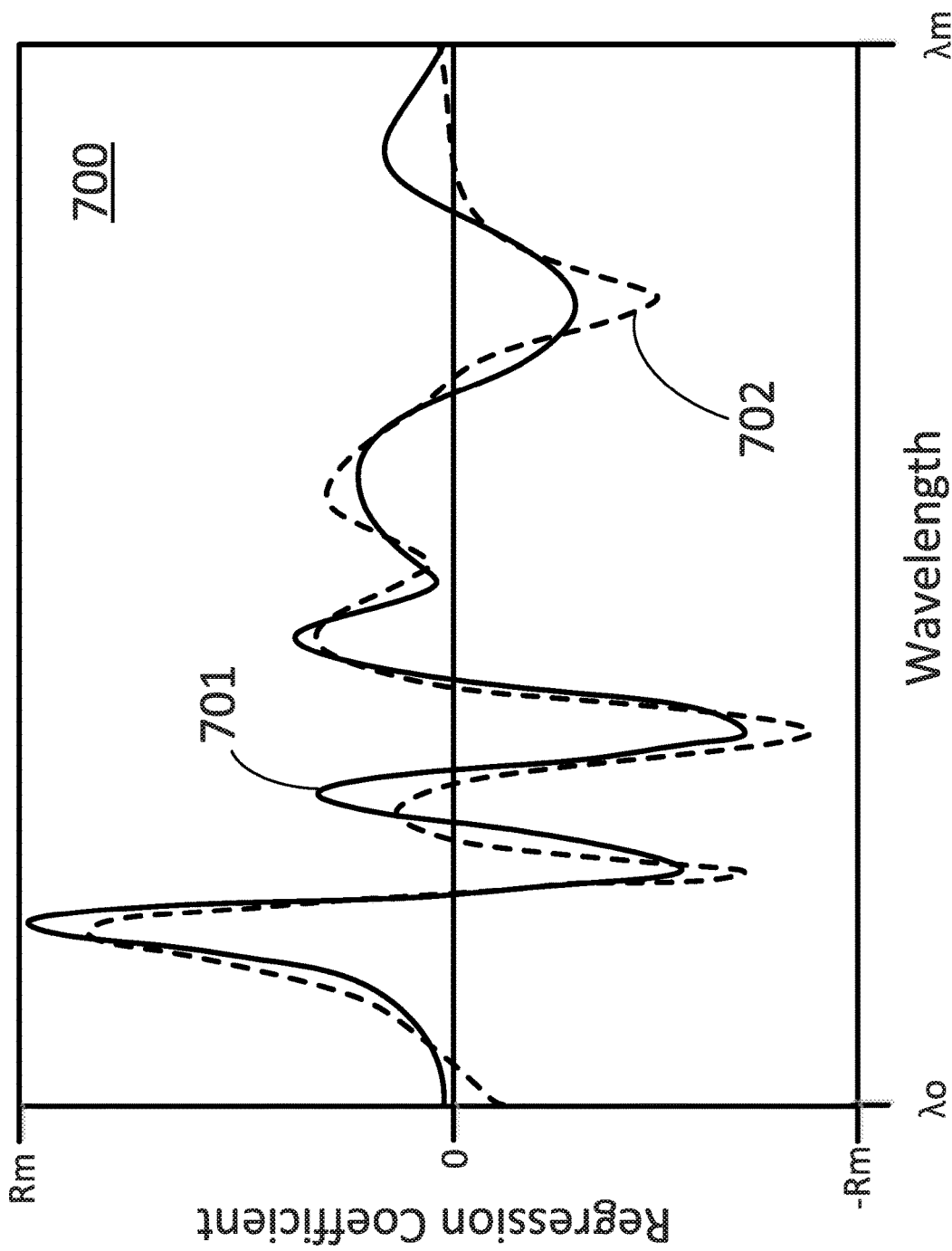
FIG. 7 illustrates a chart with optical regression vector for an optical computing device using dual ICE sensing elements and a partial least square (PLS) regression vector for a $CO_2$ measurement.

FIG. 7 illustrates a chart 700 with optical regression vector 701 from a dual-ICE optical computing device and optical regression vector 702 from a PLSR solution for a $CO_2$ measurement (e.g., using spectra 301, cf. FIG. 3). Accordingly, vector 702 is the gold standard multivariate linear regression solution to $CO_2$ concentration measurement in liquid oil. The abscissae ($\lambda_0$, $\lambda_m$) in chart 700 may be as described above (e.g., charts 300 and 600, cf. FIGS. 3 and 6). The ordinates in chart 700 may be positive and negative, covering a range (-Rm, Rm), where $|Rm| \leq 1$.

In some embodiments, vector 701 may be computed as:

$$\text{Vec}_{701} = \beta_1 \cdot T_{1opt} + \beta_2 \cdot T_{2opt} \quad (4)$$

where $T_{1opt}$ is the transmission spectrum of ICE 100-1, and $T_{2opt}$ is the transmission spectrum of ICE 100-2 (e.g., spectra 601 and 602, cf. FIG. 6 and Eq. 2). Vector 701 may have positive and negative components when the values of $\beta_1$ and $\beta_2$ have opposite sign. Accordingly, vector 701 may closely resemble a theoretical optimum performance as indicated by vector 702. Thus, a dual-ICE optical computing device as disclosed herein may closely reproduce the performance of a high fidelity PLSR solution (cf. point 510, FIG. 5) to the measurement problem.

Figure 8:
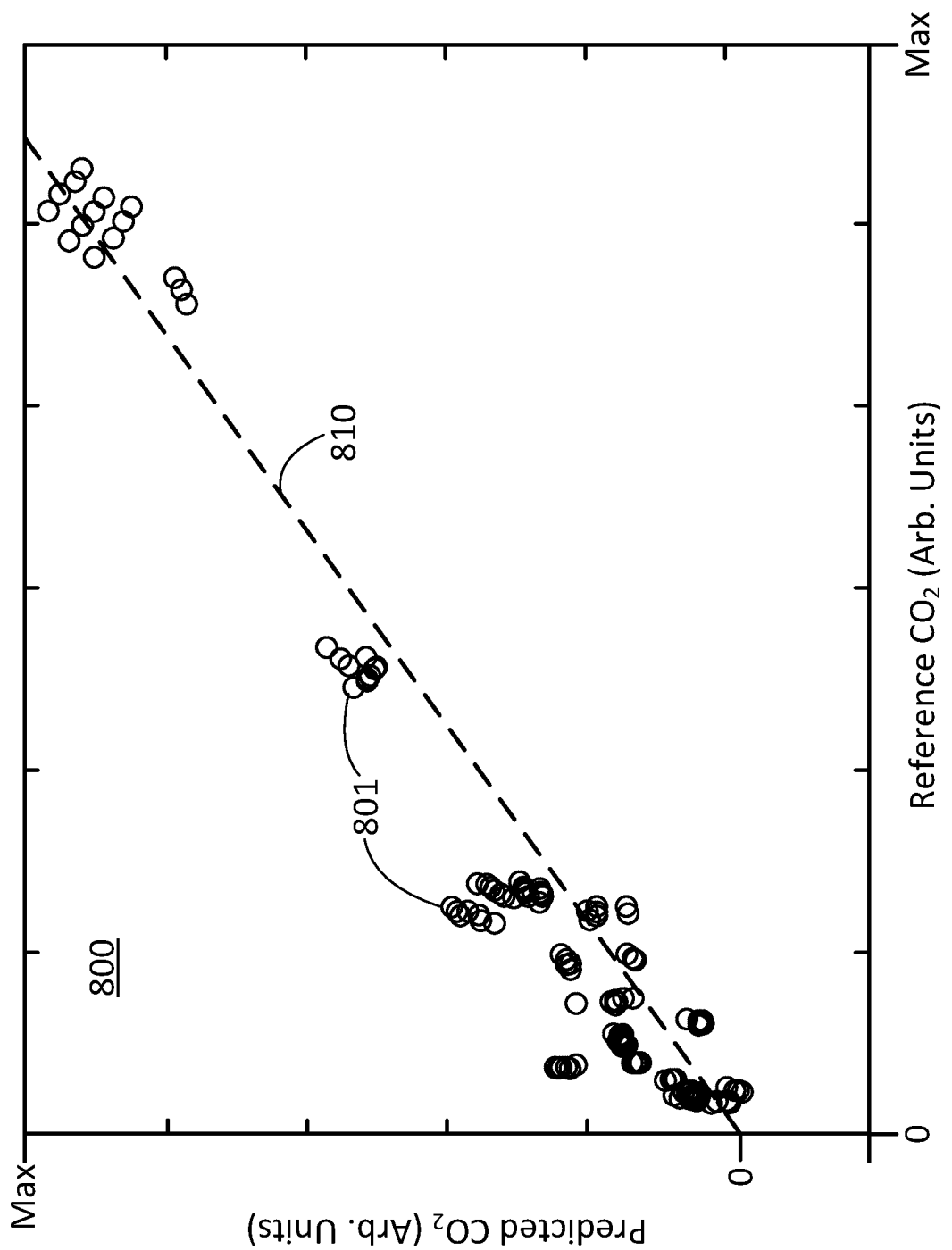
FIG. 8 illustrates a performance chart 800 of an optical computing device for measuring a $CO_2$ concentration in a hydrocarbon liquid.

FIG. 8 illustrates a performance plot 800 of dual-ICE optical computing device 101 for measuring a $CO_2$ concentration in a hydrocarbon liquid (cf. FIGS. 3 and 7). The abscissae in plot 800 are the actual $CO_2$ concentrations of the calibration samples in arbitrary units (from zero to Max). The ordinates in plot 800 are the $CO_2$ concentration as determined by dual-ICE optical computing device 101 in the same units as the abscissae. Each of data points 801 in plot 800 corresponds to one of spectra 301 (cf. FIG. 3).

Curve 810 is the best linear fit to the distribution of points 801. It is desirable that curve 810 be a straight line with unity slope passing through the origin (zero $CO_2$ in calibrated sample corresponding to zero $CO_2$ determined concentration). A standard error of calibration (SEC) obtained from the deviation of points 801 from curve 810 is estimated to be approximately 0.006 g/cc, which is slightly above the SEC of PLSR regression (e.g., abscissa 511 in point 510, cf. FIG. 5, the 'gold standard').

Figure 9:
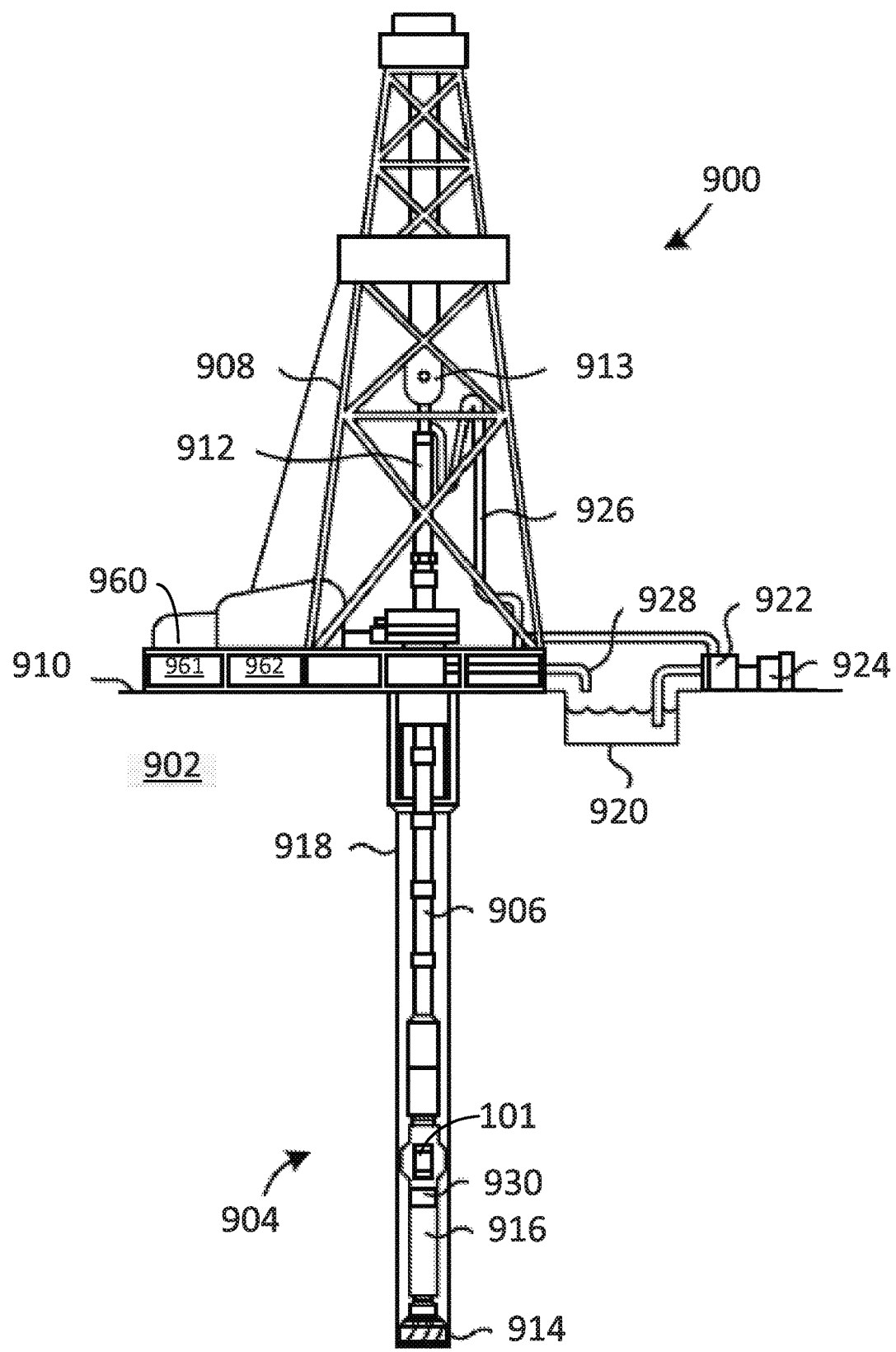
FIG. 9 illustrates a logging while drilling system including a sensor that uses an optical computing device improved with an optical computing device.

FIG. 9 illustrates a drilling system 900 including a sensor that uses an optical computing device with a dual ICE sensing element. A downhole tool 930 includes optical computing device 101 for measuring a selected characteristic of a formation fluid. The drilling system 900 may be configured to drive a bottom hole assembly (BHA) 904 positioned or otherwise arranged at the bottom of a drill string 906 extended into the earth 902 from a derrick 908 arranged at the surface 910. The derrick 908 includes a kelly 912 and a traveling block 913 used to lower and raise the kelly 912 and the drill string 906. The BHA 904 may include a drill bit 914 operatively coupled to a tool string 916 which may be moved axially within a drilled wellbore 918 as attached to drill string 906. During operation, drill bit 914 penetrates earth 902 and thereby creates wellbore 918. BHA 904 provides directional control of drill bit 914 as it advances into earth 902. Tool string 916 can be semi-permanently mounted with various measurement tools such as, but not limited to, measurement-while-drilling (MWD) and logging-while-drilling (LWD) tools, and the downhole tool 930. Downhole tool 930 may be configured to take downhole measurements of drilling conditions. In some embodiments, downhole tool 930 may be self-contained within tool string 916, as shown.

Fluid or "mud" from a mud tank 920 may be pumped downhole using a mud pump 922 powered by an adjacent power source, such as a prime mover or motor 924. The mud may be pumped from mud tank 920, through a stand pipe 926, which feeds the mud into the drill string 906 and conveys the same to the drill bit 914. The mud exits one or more nozzles arranged in the drill bit 914 and in the process cools drill bit 914. After exiting drill bit 914, the mud circulates back to surface 910 via the annulus defined between wellbore 918 and drill string 906, and in the process, returns drill cuttings and debris to the surface. The cuttings and mud mixture are passed through a flow line 928 and are processed such that a clean mud is returned down hole through stand pipe 926 once again.

Downhole tool 930 may be controlled from the surface 910 by a controller 960 having a processor 961 and a memory 962. Accordingly, memory 962 may store commands that, when executed by processor 961, cause controller 960 to perform at least some steps in methods consistent with the present disclosure. For example, as a result of a value measured for the selected characteristic of a formation fluid by optical computing device 101, controller 960 may adjust or modify a drilling parameter in drilling system 900. Modifying a drilling parameter in drilling system 900 may include adjusting a drill speed, adjusting a flow rate of the drilling mud or modifying a drilling direction for drill bit 914 (e.g., from horizontal to vertical or vice versa). In some embodiments, modifying a drilling parameter may include injecting an additive to the drilling mud to regulate the temperature of drill bit 914, or to improve the quality of the mud or the extracted hydrocarbon, or to prevent the extracted fluid from foaming or forming solid condensates along wellbore 918.

Figure 10:
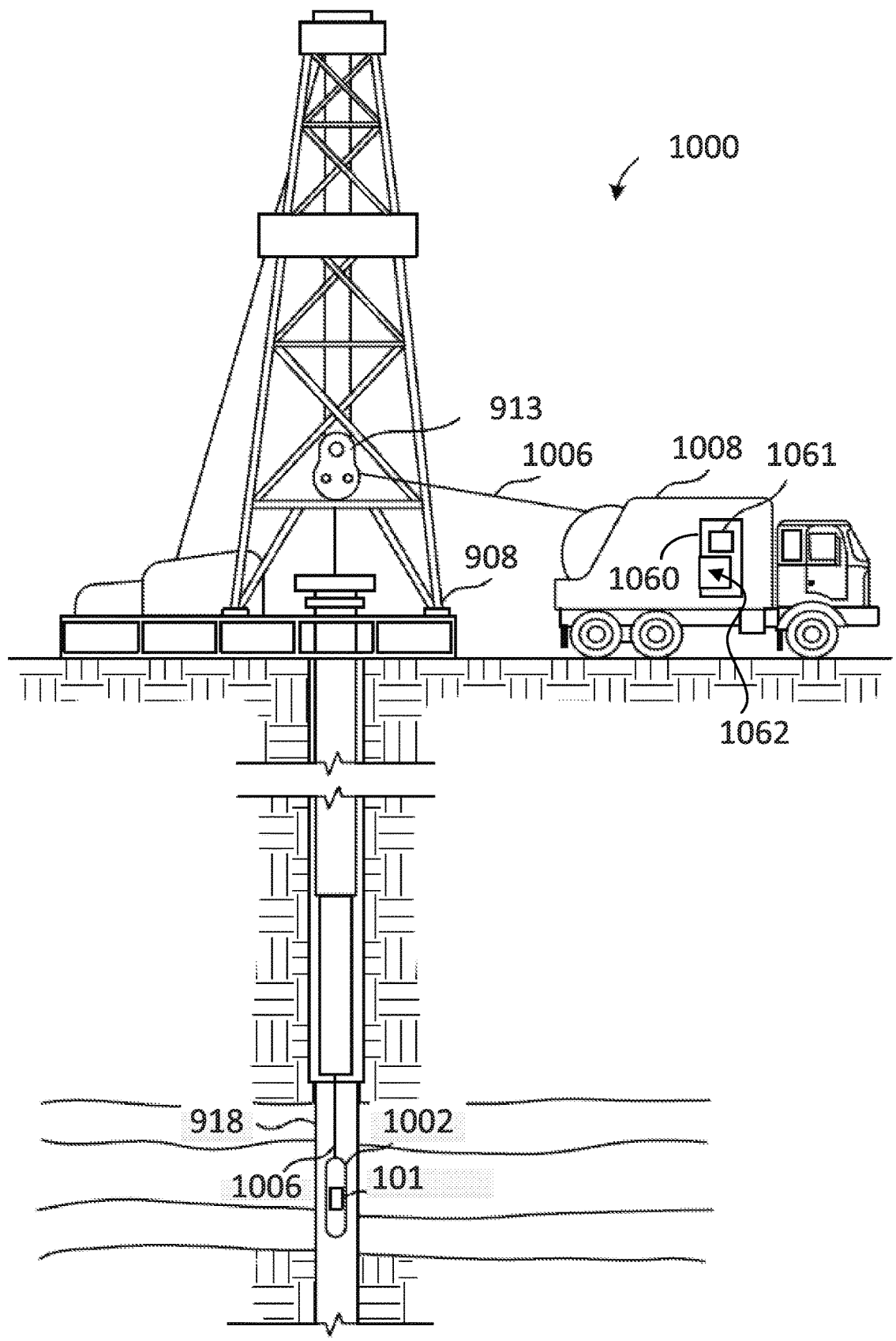
FIG. 10 illustrates a wireline system configured to measure a characteristic of a sample during formation testing and sampling with an optical computing device.

FIG. 10 illustrates a wireline system 1000 configured to measure a characteristic of a sample during formation testing and sampling with an optical computing device 101. Wireline system 1000 may be configured to use a formation tester and calibrated optical tool in determining types of formation fluids and the associated characteristics through sampling after drilling of wellbore 918 is complete. System 1000 may include a downhole tool 1002 that forms part of a wireline logging operation that can include one or more dual-ICE optical computing devices 101, as described herein, as part of a downhole measurement tool. System 1000 may include derrick 908 supporting traveling block 913. Wireline logging tool 1002, such as a probe or sonde, may be lowered by wireline or logging cable 1006 into wellbore 918. Tool 1002 may be lowered to the potential production zone or the region of interest in the wellbore, and used in conjunction with other components of the formation tester such as packers and pumps to perform well testing and sampling.

Optical computing device 101 measures a selected characteristic of the formation fluids. Measurement data generated by optical computing device 101 may be real-time processed for decision-making in the downhole. In some embodiments, measurements from optical computing device 101 are communicated to a surface logging facility 1008 for storage, processing, and/or analysis. Logging facility 1008 may be provided with controller 1060, including a processor 1061 and a memory 1062 (e.g., controllers 160 and 960*m* processors 161 and 961, and memories 162 and 962, cf. FIGS. 1 and 9). Memory 1062 stores data and commands which, when executed by processor 1061, cause controller 1060 to direct wireline system 1000 to perform steps in methods consistent with the present disclosure.

Figure 11:
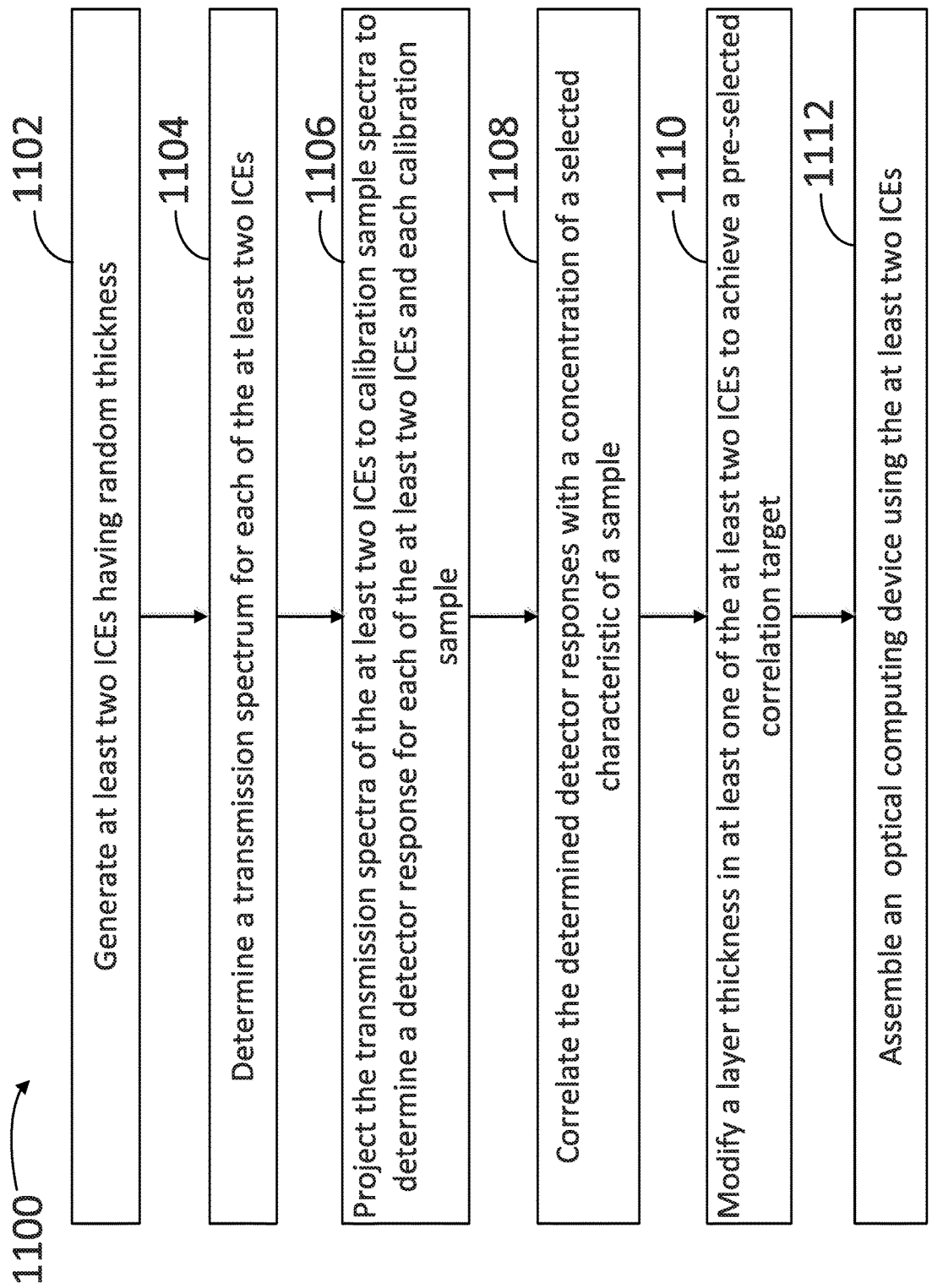
FIG. 11 illustrates a flow chart including steps in a method for fabricating an optical computing device.

FIG. 11 illustrates a flow chart including steps in a method 1100 for fabricating an optical computing device. The optical computing device may include optical components, sensing elements, detectors, and a controller having a processor and a memory (e.g., optical components 110, sensing elements 100, detectors 130, controller 160, processor 161, and memory 162, in optical computing devices 101, cf. FIGS. 1A-B). The memory in the controller may include commands which, when executed by the controller, cause the optical computing device to measure a selected characteristic of a sample. Furthermore, in some embodiments the optical computing device may be part of a system for measuring the selected characteristic of a sample using an optical source to interact an illumination light with a sample and generate a sample light (e.g., optical source 140, illumination light 141, sample 150, and sample light 142, cf. FIGS. 1A-B). Method 1100 may be performed using a plurality of calibrated data samples from a plurality of reference fluids (e.g., spectra 301, cf. FIG. 3). Methods consistent with the present disclosure may include at least some, but not all of the steps illustrated in method 1100, performed in a different sequence. Furthermore, methods consistent with the present disclosure may include at least two or more steps as in method 1100 performed overlapping in time, or almost simultaneously.

Step 1102 includes generating at least two ICEs having random thickness. Step 1102 may include generating more than two initial random ICE core transmission functions. Step 1102 includes randomly assigning a certain number of total layers and a random thickness to form a random film stack.

Step 1104 includes determining a transmission spectrum for each of the at least two ICEs. Step 1106 includes projecting the transmission spectra of the at least two ICEs to calibration sample spectra to determine a detector response for each of the at least two ICEs and each calibration sample. In some embodiments, step 1106 includes convolving an ICE transmission spectrum with a calibration sample spectrum and with a detector efficiency spectrum.

Step 1108 includes correlating the determined detector responses with a concentration of a selected characteristic of a sample. In some embodiments, step 1108 includes performing a multiple linear regression correlation algorithm such as a PLSR algorithm. Step 1108 may further include estimating a calibration error such as a SEC. Step 1108 may include using a merit-based performance function to evaluate the predictive performance of the at least two ICEs. The merit-based performance function may be a SEC, or a sensitivity function, a root mean standard error of calibration ("RMSEC"), or any combination of the above.

Step 1108 may further include developing a Multivariate Linear Regression (MLR) model using the detector responses from the at least two ICEs as independent variables and the concentration of the selected characteristic of the sample as dependent variable. In step 1108, the selected characteristic of the sample may be an analyte concentration in a liquid or a physical property of a fluid (e.g., a formation fluid). The analyte concentration may be a methane concentration, a $CO_2$ concentration, or a water concentration in a hydrocarbon fluid. The physical property of the fluid may be a gas-oil-ratio, a bubble point, a condensation point, or the like.

Step 1110 includes modifying a layer thickness in at least one of the at least two ICEs to achieve a pre-selected correlation target. Step 1110 may include optimizing layer thicknesses of the at least two ICEs so that a linear combination of the two detector responses resembles a dot product of the spectrum of the sample light with a regression vector, wherein the regression vector is associated with the selected characteristic of the sample. In some embodiments, the layer thickness of the at least two ICEs is optimized simultaneously. In some embodiments, step 1110 includes selecting the merit function as the correlation target. Further, step 1110 may include optimizing the initial at least two ICEs to improve the merit function using the determined detector responses for each of the at least two ICEs at each step of the optimization algorithm.

Step 1110 may include determining an analytical sensitivity performance based on multivariate Linear Regression model and Net Analyte Signal (NAS) analysis. NAS, finds a Net analyte signal, which is a spectral component of a mixture that is unique for the analyte of interest, i.e., it is orthogonal to the spectra of the interferences.

In some embodiments, step 1110 includes iteratively changing the film stack model (number of layers and/or thicknesses of each layer) of the at least two ICEs such that a new set of at least two ICE transmission functions are established.

Step 1112 includes assembling an optical computing device using the at least two ICEs obtained from the optimization. In some embodiments, step 1112 may include storing in the memory of the controller at least one parameter associated with the PLSR model or the MLR model used to correlate the determined detector responses with the concentration of the selected characteristic of the sample. For example, in some embodiments step 1112 includes storing in the memory of the controller the values of $\beta_1$, $\beta_2$, and $\alpha$ (cf. Eq. 2).

Further, step 1112 may include forming two of the at least two ICEs as separate optical components in the optical train of the dual-ICE optical computing device, and associating each of the two ICEs with a single detector. In some embodiments, step 1112 may include mounting the two ICEs radially on the plane of a rotating disk configured to rotate in an axis parallel to the axis of the optical train of the dual-ICE optical computing device, thereby using a single detector to obtain the responses from the two ICEs.

Embodiments disclosed herein include:

A. A device, including at least two integrated computational elements (ICEs) that optically interact with a sample light to generate a first modified light and a second modified light, wherein the at least two ICEs each include a plurality of alternating layers of material and each layer of material has a thickness selected such that a weighted linear combination of a transmission function from each of the at least two ICEs is similar to a regression vector associated with a characteristic of the sample. The device further including a detector that separately measures a property of the first and second modified lights to generate a first signal and a second signal, respectively, wherein the weight average of first and second signals is linearly related to the characteristic of the sample.

B. A system, including an optical source that generates an illumination light to interact with a sample and form a sample light. In some embodiments, the system includes an optical computing device having at least two integrated computational elements (ICEs) that optically interact with a sample light to generate a first modified light and a second modified light, wherein the at least two ICEs each comprise a plurality of alternating layers of material and each layer has a thickness selected such that the weighted linear combination of a transmission function of each of the at least two ICEs is similar to a regression vector associated with a characteristic of the sample, and a detector that separately measures a property of the first and second modified lights to generate a first signal and a second signal, respectively, wherein the first and second signals are linearly related to the characteristic of the sample. The system may also include a controller comprising a processor and a memory, wherein the processor receives the first and second signal and determines a value for the desired characteristic of the sample.

C. A method, including generating at least two integrated computational elements ICEs, each ICE including a plurality of alternating layers of material and each layer having a random thicknesses and determining a transmission spectrum for each of the at least two ICEs and projecting the transmission spectra of the at least two ICEs to a calibration sample spectra to determine a detector response for each of the at least two ICEs and each calibration sample. The method may also include correlating the detector responses with a concentration of a selected characteristic of a sample, modifying a thickness of one or more of the layers in at least one of the at least two ICEs to achieve a pre-selected correlation target, and assembling an optical computing device including the at least two ICEs when the correlation target is achieved.

Each of embodiments A, B, and C may have one or more of the following additional elements in any combination. Element 1, wherein the first and second modified lights are measured by the detector at separate times. Element 2, wherein the at least two ICEs are positioned along separate optical trains of the device and the detector comprises at least two detectors that collect the first and second modified lights, respectively. Element 3, wherein the at least two ICEs are mounted on a disk that rotates about an axis parallel to an optical train of the device and the detector is a single detector that collects the first and second modified lights separately in time. Element 4, wherein a linear combination of the first and second signals is approximately equal to a dot product of a spectrum of the sample light and a regression vector associated with the characteristic of the sample. Element 5, wherein the detector comprises a first and a second detector to measure a property of the first and second modified lights, respectively.

Element 6, wherein the at least two ICEs are positioned along separate optical trains of the device and the detector includes at least two detectors that collect the first and second modified lights, respectively. Element 7, wherein the at least two ICEs are mounted on a disk that rotates about an axis parallel to an optical train of the device and the detector is a single detector that collects the first and second modified lights separately in time. Element 8, wherein a linear combination of the first and second signals is approximately equal to a dot product of a spectrum of the sample light with a regression vector associated with the characteristic of the sample. Element 9, wherein the memory stores: a first parameter and a second parameter in a linear relation between the characteristic of the sample and the first and second signals, a constant value, an instruction for the processor to form a first product of the first parameter with the first signal and a second product of the second parameter with the second signal, and an instruction for the processor to add the first product and the second product to the constant value and determine the value for the desired characteristic of the sample. Element 10, wherein the first parameter, the second parameter, and the constant value are dependent on temperature and pressure, and the memory further stores a table associating each of a plurality of first parameters, second parameters, and constant values, to one of a temperature value and a pressure value.

Element 11, wherein correlating the detector responses comprises developing one of a partial least squares regression or a multivariate linear regression using the detector responses as input variables and the concentration of a selected characteristic of a sample as an output variable. Element 12, further including: selecting the correlation target with a merit function, and forming the merit function from one of a standard error of calibration, a sensitivity of detection, and a weighted average of a standard error of calibration and a sensitivity of detection. Element 13, wherein correlating the detector responses includes finding a slope in the correlation of the detector responses with the concentration of the characteristic of the sample. Element 14, wherein correlating the detector responses includes: finding a plurality of parameters in a linear correlation between the detector responses and the concentration of the selected characteristic of a sample, and finding a lookup table associating the plurality of parameters with each of a plurality of sample temperatures and a plurality of sample pressures. Element 15, wherein correlating the detector responses includes: determining a regression vector for the concentration of the selected characteristic of the sample with a plurality of sample spectra in a database, and comparing the detector responses with a dot product of the regression vector and a spectrum in the database. Element 16, wherein assembling an optical computing device including the at least two ICEs includes at least one of forming a single optical component from the at least two ICEs on a common substrate, or forming at least two separate optical components, each having one ICE. Element 17, further including optimizing layer thicknesses of the at least two ICEs so that a linear combination of the two detector responses resembles a dot product of the spectrum of the sample light with a regression vector, wherein the regression vector is associated with the selected characteristic of the sample.

Those skilled in the art will readily appreciate that the methods described herein, or large portions thereof may be automated at some point such that a computerized system may be programmed to transmit data from an optical computing device using an ICE element. Computer hardware used to implement the various methods and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements such as, for example, a memory (e.g., random access memory (RAM), flash memory, read only memory (ROM), programmable read only memory (PROM), electrically erasable programmable read only memory (EEPROM)), registers, hard disks, removable disks, CD-ROMS, DVDs, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the present embodiments are not limited to any specific combination of hardware and/or software.

As used herein, a machine-readable medium will refer to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The disclosure clamed is:

1. A device, comprising:
at least two integrated computational elements (ICEs) that optically interact with a sample light to generate a first modified light and a second modified light, wherein the at least two ICEs each comprise a plurality of alternating layers of material and each layer of material has a thickness selected such that a weighted linear combination of a transmission function from each of the at least two ICEs is similar to a regression vector associated with a characteristic of a sample; and
a detector that separately measures a property of the first modified light to generate a first signal comprising a first transmission function weighted by a first coefficient and the second modified light to generate a second signal comprising a second transmission function weighted by a second coefficient different from the first coefficient, wherein a weighted average of first signal and the second signal is linearly related to the characteristic of the sample.

2. The device of claim 1, wherein the first and second modified lights are measured by the detector at separate times.

3. The device of claim 1, wherein the at least two ICEs are positioned along separate optical trains of the device and the detector comprises at least two detectors that collect the first and second modified lights, respectively.

4. The device of claim 1, wherein the at least two ICEs are mounted on a disk that rotates about an axis parallel to an optical train of the device and the detector is a single detector that collects the first and second modified lights separately in time.

5. The device of claim 1, wherein a linear combination of the first and second signals is approximately equal to a dot product of a spectrum of the sample light and a regression vector associated with the characteristic of the sample.

6. The device of claim 1, wherein the detector comprises a first and a second detector to measure a property of the first and second modified lights, respectively.

7. A system, comprising:
an optical source that generates an illumination light to interact with a sample and form a sample light;
an optical computing device comprising:
at least two integrated computational elements (ICEs) that optically interact with the sample light to generate a first modified light and a second modified light, wherein the at least two ICEs each comprise a plurality of alternating layers of material and each layer has a thickness selected such that a weighted linear combination of a transmission function of each of the at least two ICEs is similar to a regression vector associated with a characteristic of the sample; and
a detector that separately measures a property of the first modified light to generate a first signal comprising a first transmission function weighted by a first coefficient and the second modified light to generate a second signal comprising a second transmission function weighted by a second coefficient different from the first coefficient, wherein a weighted average of first signal and the second signal is linearly related to the characteristic of the sample; and
a controller comprising a processor and a memory, wherein the processor receives the first and second signal and determines a value for the desired characteristic of the sample.

8. The system of claim 7, wherein the at least two ICEs are positioned along separate optical trains of the device and the detector comprises at least two detectors that collect the first and second modified lights, respectively.

9. The system of claim 7, wherein the at least two ICEs are mounted on a disk that rotates about an axis parallel to an optical train of the device and the detector is a single detector that collects the first and second modified lights separately in time.

10. The system of claim 7, wherein a linear combination of the first and second signals is approximately equal to a dot product of a spectrum of the sample light with a regression vector associated with the characteristic of the sample.

11. The system of claim 7, wherein the memory stores:
a first parameter and a second parameter in a linear relation between the characteristic of the sample and the first and second signals;
a constant value;
an instruction for the processor to form a first product of the first parameter with the first signal and a second product of the second parameter with the second signal; and
an instruction for the processor to add the first product and the second product to the constant value and determine the value for the desired characteristic of the sample.

12. The system of claim 11, wherein the first parameter, the second parameter, and the constant value are dependent on temperature and pressure, and the memory further stores a table associating each of a plurality of first parameters, second parameters, and constant values, to one of a temperature value and a pressure value.

13. A method, comprising:
generating at least two integrated computational elements ICEs, each ICE comprising a plurality of alternating layers of material and each layer having a random thicknesses;
determining a transmission spectrum for each of the at least two ICEs;
projecting the transmission spectrum for each of the at least two ICEs to a calibration sample spectra to determine a detector response for each of the at least two ICEs and each calibration sample;
correlating the detector responses with a concentration of a selected characteristic of a sample;
modifying a thickness of one or more of the layers in at least one of the at least two ICEs iteratively to achieve a pre-selected correlation target; and
assembling an optical computing device including the at least two ICEs when the correlation target is achieved.

14. The method of claim 13, wherein correlating the detector responses comprises developing one of a partial least squares regression or a multivariate linear regression using the detector responses as input variables and the concentration of a selected characteristic of a sample as an output variable.

15. The method of claim 13, further comprising:
selecting the correlation target with a merit function; and
forming the merit function from one of a standard error of calibration, a sensitivity of detection, and a weighted average of a standard error of calibration and a sensitivity of detection.

16. The method of claim 13, wherein correlating the detector responses comprises finding a slope in the correlation of the detector responses with the concentration of the characteristic of the sample.

17. The method of claim 13, wherein correlating the detector responses comprises:
finding a plurality of parameters in a linear correlation between the detector responses and the concentration of the selected characteristic of a sample; and
finding a lookup table associating the plurality of parameters with each of a plurality of sample temperatures and a plurality of sample pressures.

18. The method of claim 13, wherein correlating the detector responses comprises:
determining a regression vector for the concentration of the selected characteristic of the sample with a plurality of sample spectra in a database; and
comparing the detector responses with a dot product of the regression vector and a spectrum in the database.

19. The method of claim 13, wherein assembling an optical computing device including the at least two ICEs comprises at least one of forming a single optical component from the at least two ICEs on a common substrate, or forming at least two separate optical components, each having one ICE.

20. The method of claim 13, further comprising determining layer thicknesses of the at least two ICEs so that a linear combination of the two detector responses resembles a dot product of the spectrum of the sample light with a regression vector, wherein the regression vector is associated with the selected characteristic of the sample.

* * * * *